(12) United States Patent
Takabe

(10) Patent No.: US 6,333,297 B2
(45) Date of Patent: Dec. 25, 2001

(54) CONSTANT-VELOCITY UNIVERSAL JOINT FOR PROPELLER SHAFT

(75) Inventor: Shinichi Takabe, Iwata (JP)

(73) Assignee: NTN Corporation, Shizuoka (JP)

( * ) Notice: Subject to any disclaimer, the term of this patent is extended or adjusted under 35 U.S.C. 154(b) by 0 days.

(21) Appl. No.: 09/749,694

(22) Filed: Dec. 28, 2000

(30) Foreign Application Priority Data

Jan. 7, 2000 (JP) .................................. 12-001766

(51) Int. Cl.$^7$ ................................ C10M 141/86
(52) U.S. Cl. .................. 508/364; 508/363; 508/369; 508/375; 508/539; 508/552
(58) Field of Search .................... 508/363, 364, 508/369, 375, 539, 552

(56) References Cited

U.S. PATENT DOCUMENTS

| | | | |
|---|---|---|---|
| 4,724,708 | * | 2/1988 | Okano et al. ........................... 73/460 |
| 4,771,842 | * | 9/1988 | Mishio et al. ....................... 180/75.2 |
| 5,624,889 | * | 4/1997 | Ozaki et al. ........................... 508/162 |
| 5,922,654 | * | 7/1999 | Yamazaki et al. .................... 508/364 |
| 5,952,273 | * | 9/1999 | Suzuki et al. ......................... 508/168 |
| 6,010,409 | * | 1/2000 | Johnson ................................ 464/133 |
| 6,022,835 | * | 2/2000 | Fletcher ................................ 508/365 |

\* cited by examiner

*Primary Examiner*—Jacqueline V. Howard
(74) *Attorney, Agent, or Firm*—Greenblum & Bernstein, P.L.C.

(57) ABSTRACT

A constant-velocity joint for a propeller shaft is provided which can be used with good durability without adding any organic lead compound, which is high in the effect of suppressing temperature rise of grease during high-speed rotation, and which can prevent deterioration of the grease. It is a cross-groove type constant-velocity joint in which the PCD clearance is negative and a preload is imparted or any other constant-velocity joint for a propeller shaft in which a grease containing the following components (a), (b) and (g) or (a) to (g) as essential components is sealed:
(a) base oil (b) diurea type thickening agent expressed by the following formula $$R_1NH—CO—NH—C_6H_4—p—CH_2—C_6H_4—p—NH—CO—NHR^2$$

(wherein $R^1$ and $R^2$ are the same or different aryl or cyclohexyl groups having a carbon number of 6 or 7)
(c) molybdenum sulfurized dialkyl dithiocarbamate, molybdenum sulfurized dialkyl dithiophosphate, or a mixture thereof, (d) molybdenum disulfide, (e) Zinc dithiophosphate compound, sulfur-nitrogen-family extreme-pressure agent or an extreme-pressure agent in which both are mixed, (f) phosphorus-free, sulfur-containing extreme-pressure agent, (g) sulfur-containing organic tin compound.

4 Claims, 3 Drawing Sheets

CONSTANT-VELOCITY UNIVERSAL JOINT FOR PROPELLER SHAFT

BACKGROUND OF THE INVENTION

This invention relates to a constant-velocity universal joint for a propeller shaft used at a coupling portion of a propeller shaft for transmitting a driving force in the back-and-forth direction of an automobile body.

Such a constant-velocity joint for a propeller shaft, and a constant-velocity joint for a drive shaft provided near a wheel and used at a coupling portion of a drive shaft for transmitting the rotation force from a differential gear to the wheel are typical constant-velocity joints for automobiles.

Since a propeller shaft is a rather heavy object and rotates at a high speed compared with a drive shaft, a load on the constant-velocity joint is large and the accuracy of its motion influences the degree of perfection of the propeller shaft.

A cross-groove type constant-velocity joint is known as a constant-velocity joint used for such a propeller shaft. It has a general structure as shown in FIGS. 1 and 2, in which a plurality of grooves (also referred to as tracks) formed in the outer peripheral surface of an inner ring 1 and the inner peripheral surface of an outer ring 2 extend in such directions as to cross each other (in a torsional relationship in a three-dimensional view) with balls 5 mounted at portions where grooves 3 of the inner ring 1 and opposing grooves 4 of the outer ring 2 cross each other. The balls 5 are rotatably retained by a cage 6.

In such a constant-velocity joint, a lubricating grease is sealed to prevent abnormal wear at portions that are liable to wear due to the rotation of the shaft and to increase durability, thereby maintaining the rotational resistance at a low level.

Various designs are proposed to cross-groove type constant-velocity joints for propeller shafts. Ones are preferable which are designed such that there will be no internal clearances, particularly no clearance in the pitch circle (PCD) direction (referred generally to as PCD clearance) so that they rotate smoothly without producing vibration or abnormal sound especially during high-speed rotation. In particular, ones structured such that the PCD clearance is negative and a preload is applied are used in applications where high-speed rotation is required.

Since such conventional constant-velocity joints for propeller shafts are used in applications where they rotate at a high speed exceeding 2000 rpm, the grease may be heated to high temperature and deteriorate. If this happens, the frictional surface may not be lubricated sufficiently.

Also, if a grease containing organic lead compound as an extreme-pressure agent is sealed in a constant-velocity joint for a propeller shaft, deterioration in quality of such a grease can be avoided. But in view of a bad influence of the disposed grease on the biosphere, using an organic lead compound as an additive should be avoided if possible.

An object of this invention is to provide a constant-velocity joint for a propeller shaft which can be used with good durability without adding any organic lead compound, which is high in the effect of suppressing temperature rise of grease (so-called temperature-rise suppressing effect) especially during high-speed rotation, and which can prevent quality deterioration of the grease.

Another object of this invention is to provide a cross-groove type constant-velocity joint for a propeller shaft in which the PCD clearance is negative and a preload is imparted, and which is high in the temperature-rise suppressing effect.

SUMMARY OF THE INVENTION

According to this invention, there is provided a constant-velocity joint for a propeller shaft in which a grease containing the following components (a), (b) and (g) as essential components is sealed:

(a) base oil (b) diurea type thickening agent expressed by the following formula

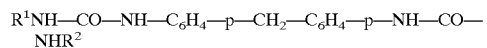

$$R^1NH-CO-NH-C_6H_4-p-CH_2-C_6H_4-p-NH-CO-NHR^2$$

(wherein $R^1$ and $R^2$ are the same or different aryl or cyclohexyl groups having a carbon number of 6 or 7.)

(g) sulfur-containing organic tin compound.

As the constant-velocity joint for a propeller shaft, a cross-groove type constant-velocity joint may be used. Furthermore, if the constant-velocity joint for a propeller shaft is one in which the PCD clearance is negative and a preload is applied, it is preferable to employ the abovementioned grease to obtain a desired effect.

The grease using diurea which is component (b) has a stable micellar structure and adheres more strongly to metal surface, compared with an aliphatic diurea grease using an aliphatic amine and a lithium soap grease when used in a cross-groove type constant-velocity joint, which is subjected to a strong shearing force. Also, metal-to-metal contact is prevented by the thickening agent.

In the present invention, since a lubricating grease containing a diurea type thickening agent and a sulfur-containing organic tin compound is sealed in a constant-velocity joint for a propeller shaft, durability is improved without adding any organic lead compound. Also, the effect of suppressing the temperature rise of the grease especially during high-speed rotation, and of preventing deterioration of quality of the grease can be expected.

In another invention of the present application, there is provided, in the above-described constant-velocity joint for a propeller shaft, a constant-velocity joint for a propeller shaft in which a grease containing the following components (a) to (g) as essential components:

(a) base oil (b) diurea type thickening agent expressed by the following formula

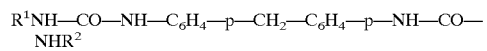

$$R^1NH-CO-NH-C_6H_4-p-CH_2-C_6H_4-p-NH-CO-NHR^2$$

(wherein $R^1$ and $R^2$ are the same or different aryl or cyclohexyl groups having a carbon number of 6 or 7.)

(c) molybdenum sulfurized dialkyl dithiocarbamate, molybdenum sulfurized dialkyl dithiophosphate, or a mixture thereof (d) molybdenum disulfide (e) Zinc dithiophosphate compound, sulfur-nitrogen-containing extreme-pressure agent or an extreme-pressure agent in which both are mixed (f) phosphorus-free, sulfur-containing extreme-pressure agent (g) sulfur-containing organic tin compound.

The constant-velocity joint for a propeller shaft in which a grease containing the components (c), (d), (e) and (f) besides component (g) as extreme-pressure agents is sealed is one in which a grease not containing an organic lead compound is sealed. Moreover, it provides a constant-velocity joint for a propeller shaft that is higher in durability and the temperature-rise suppressing effect than the grease not containing components (c), (d), (e) and (f).

DETAILED DESCRIPTION OF THE PREFERRED EMBODIMENT

The constant-velocity joint for a propeller shaft embodying the present invention will be described with reference to the accompanying drawings.

Figure 1:
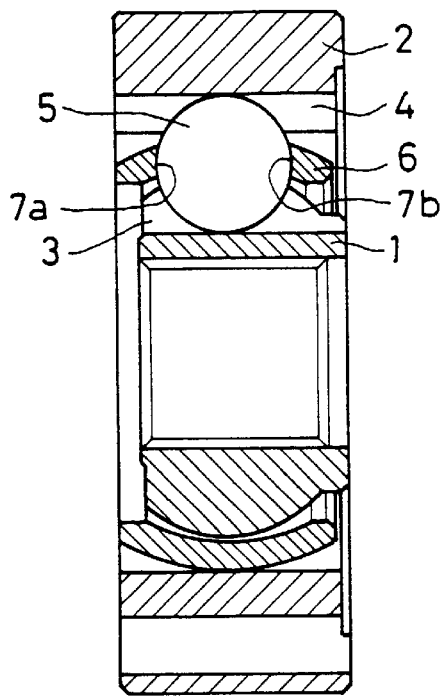
FIG. 1 is a vertical sectional view of a crossgroove type constant-velocity joint.
Figure 2:
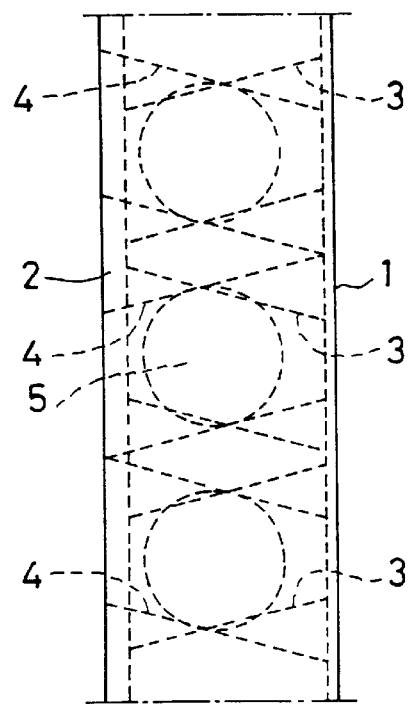
FIG. 2 is a plan view of the same.
Figure 3:
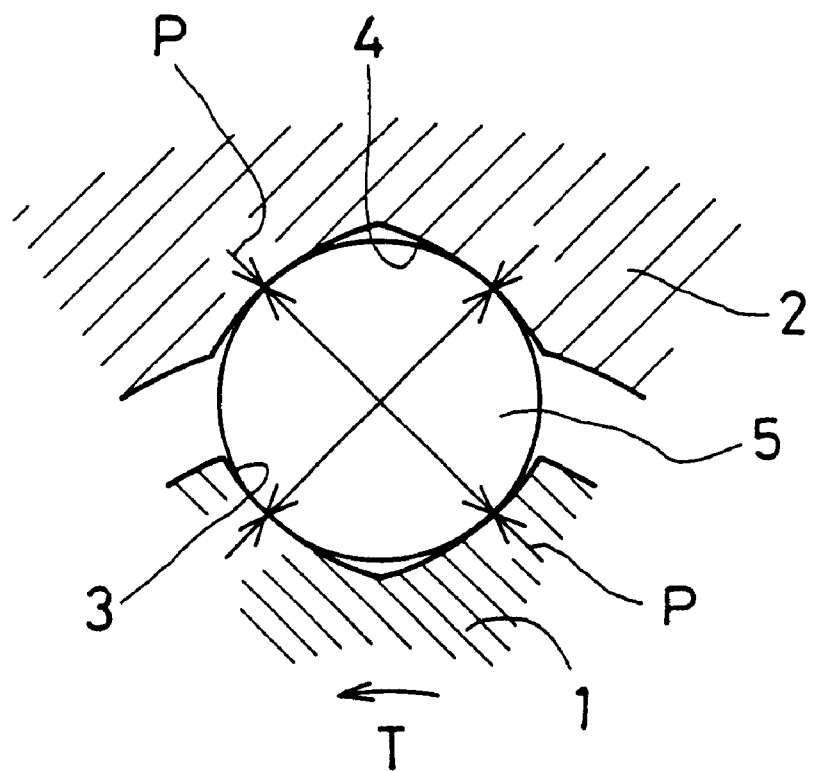
FIG. 3 is an enlarged sectional view showing how the balls are mounted in the grooves.

As shown in FIGS. 1–3, the constant-velocity joint for a propeller shaft of the embodiment is a cross-groove type joint in which balls 5 as the rolling elements are mounted in grooves formed in the joint with a PCD clearance. A grease containing the below-described components as essential components is sealed in the joint.

As shown in FIGS. 1 and 2, in the cross-groove type constant-velocity joint embodying the present invention, a plurality of grooves are formed in the outer peripheral surface of an inner ring 1 and the opposing inner peripheral surface of the outer ring 2. The grooves 3 of the inner ring 1 and the grooves 4 of the outer ring 2 are formed in such directions as to cross each other. The balls 5 are mounted so as to fit in the crossing portions between the grooves 3 of the inner ring 1 and the grooves 4 of the outer ring 2. The balls 5 are rotatably retained by a retainer 6.

As shown in FIG. 3, when a torque T is applied to the inner ring 1, vertical load P act between the grooves 3 and 4 through the balls 5. Also, axial loads act on pocket surfaces 7a and 7b of the retainer 6. They act as slide resistance and bending resistance of the joint.

Such a cross-groove type constant-velocity joint is so designed that there will be no internal clearance. In particular, ones having such a structure in which the clearance in the pitch circle direction (PCD) is negative (that is, resiliently compressed state) and the balls are pressed into the grooves 3, 4 with a preload applied are often used. In other words, in such a cross-groove type constant-velocity joint, the balls are pressed against the groove walls of the joint and resiliently compressed particularly in the pitch circle direction (PCD).

The grease sealed in such a cross-groove type constant-velocity joint has such a composition that the components (a), (b) and (g) are contained as essential components or that the components (a) to (f) and (g) are contained as essential components.

As the base oil of component (a) used in this invention, a mineral oil, ester type synthetic oil, ether type synthetic oil, or a hydrocarbon type synthetic oil can be used. Any other known lubricating oil may also be employed. They may be used singly or in combination.

The diurea type thickening agent as component (b) used in this invention comprises a diurea compound expressed by the following formula:

$$R^1NH-CO-NH-C_6H_4-p-CH_2-C_6H_4-p-NH-CO-NHR^2$$

(wherein $R^1$ and $R^2$ are the same or different aryl or cyclohexyl groups having a carbon number of 6 or 7.)

Such a diurea type thickening agent is obtained by reacting a monoamine such as aniline, p-toluidine and cyclohexylamine with diphenylmethane-4,4'-diisocyanate. In practice, a micellar structure is obtained by reacting raw materials in a base oil.

Among components (c) used in this invention, as molybdenum sulfurized dialkyl dithiocarbamate (sometimes abbreviated as MoDTC), one expressed by the following formula is particularly preferable.

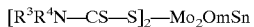

(wherein $R^3$ and $R^4$ are alkyl groups having a carbon number of 1 to 24. m+n=4, m=0 to 3, n=4 to 1.)

The above compound is a well known solid lubricant and is disclosed in Japanese patent publication 45-24562 (in which m=2.35 to 3, n=1.65 to 1), patent publication 51-964 (in which m=0, n=4), and patent publication 53-31646 (in which m=0.5 to 2.3, n=3.5 to 1.7).

Among components (c) used in this invention, molybdenum sulfurized dialkyl dithiophosphate is an extreme-pressure agent that is also called molybdenum dialkyldithiophosphate or MoDTP and expressed by the following chemical formula 1.

Formula 1

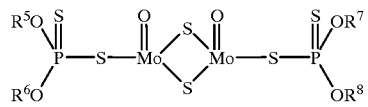

(wherein $R^5$, $R^6$, $R^7$ and $R^8$ are primary or secondary alkyl groups having a carbon number of 1 to 24, preferably 3 to 20 or aryl groups having a carbon number of 6 to 30, preferably 8 to 18.)

Molybdenum disulfide which is component (d) used in this invention is a well known solid lubricant. Since molybdenum disulfide has a laminar lattice structure and prevents metallic contact by being easily sheared into thin layers by slide movement, it has a seizure-preventive effect. But if the amount of addition is too much, it may increase the friction coefficient and have a bad influence on its vibration resistance, and also can increase wear, though depending on the lubricating conditions.

As a preferable example of the zinc dithiophosphate compound (abbreviated as ZnDTP) of component (e) used in this invention, one expressed by the following formula can be cited.

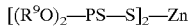

(wherein $R^9$ is an alkyl group having a carbon number of 1 to 24 or an aryl group having a carbon number of 6 to 30. Especially preferably, $R^9$ is a primary or secondary alkyl group having a carbon number of 3 to 8.)

Such a Zinc dithiophosphate compound produces an olefin from its alkyl groups by heat decomposition after adsorbed to a metal (iron) surface, and produces hydrogen sulfide, mercaptan or alkyl sulfide, and then forms an extreme-pressure film comprising an inorganic polymer containing sulfur, phosphorus and zinc to perform a wear preventive function.

The sulfur-nitrogen-containing extreme-pressure agent of component (e) used in this invention is a known extreme-pressure agent in which the sulfur content is 5–20 wt% and the nitrogen content is 1–10 wt% . Among known extreme-pressure agents containing no phosphorus and containing sulfur and nitrogen, it is an extreme-pressure agent except molybdenum sulfurized dialkyl dithiocarbamate. For example, Vanlube 601 made by R.T. Vanderbilt company may be used.

The sulfur-base extreme-pressure agent not containing phosphorus which is component (f) used in this invention is e.g. an olefin sulfide such as isobutene sulfide or a sulfide-containing compound such as dibenzyl disulfide, and is a well known extreme-pressure agent in which the content of the sulfur component is about 35–50 wt%.

As the sulfur-containing organic tin compound of component (g) used in this invention, a compound expressed by the following formula is a typical one.

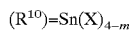

$$(R^{10})=Sn(X)_{4-m}$$

(wherein $R^{10}$ is an alkyl group, X represents $—S—(CH_2)_n—CO—OR^{11}$ or $—S—(CH_2)_n—O—CO—OR^{11}$, $R^{11}$ is an alkyl or alkenyl group, n is an integer of 1 to 18, m is an integer of 0 to 3, n and m may be the same or different from each other if $R^{10}$ and X are two or more.)

As specific examples of sulfur-containing organic tin compound, dimethyl tin bis(isooctyl thioglycol), monomethyl tin tris(isooctyl thioglycol) and di(n-octyl)tin bis (isooctyl mercaptoacetate) can be cited.

The grease comprising such components as described above is preferably of the following composition:

(a) base oil
(b) diurea type thickening agent: 1–25 wt%
(c) molybdenum sulfurized dialkyl dithiocarbamate, molybdenum sulfurized dialkyl dithiophosphate, or a mixture thereof: 0.1–5 wt%
(d) molybdenum disulfide: 0.1–5 wt%
(e) zinc dithiophosphate compound, sulfur-nitrogen-base extreme-pressure agent or an extreme-pressure agent in which both of them are mixed: 0.05–3 wt%
(f) phosphorus-free, sulfur-containing extreme-pressure agent: 0.1–5 wt%
(g) sulfur-containing organic tin compound: 0.1–5 wt%

As a more preferable composition of the grease, the following one can be cited.

(a) base oil
(b) diurea type thickening agent: 1–25 wt%
(c) molybdenum sulfurized dialkyl dithiocarbamate, molybdenum sulfurized dialkyl dithiophosphate, or a mixture thereof: 1–3 wt%
(d) molybdenum disulfide: 0.1–3 wt%, more preferably 0.1–2 wt%
(e) zinc dithiophosphate compound, sulfur-nitrogen-base extreme-pressure agent or an extreme-pressure agent in which both of them are mixed: 1–2 wt%
(f) phosphorus-free, sulfur-containing extreme-pressure agent: 1–3 wt%
(g) sulfur-containing organic tin compound: 1–3 wt%

EXAMPLES AND COMPARATIVE EXAMPLES

Example 1 (Example of a lubricating grease not containing organic lead but containing organic tin)

4100 g of base oil and 1012 g of diphenylmethane-4,4'-diisocyanate were put in a container and the mixture was heated to 70–80° C. 4100 g of base oil, 563 g of cyclohexylamine and 225 g of aniline were put in another container. After heating them to 70–80° C., the mixture was added to the former container. The mixture was reacted for 30 minutes while sufficiently agitating. Thereafter, its temperature was raised to 160° C. while agitating, and it was let to cool to obtain a base urea grease.

To this base grease, the following components (c)–(g) were added and mixed, and a lubricating grease of No. 1 grade consistency was prepared by use of a three-stage roll mill.

(c) molybdenum sulfurized dialkyl dithiocarbamate (vanlube 601 made by R.T. Vanderbilt company): 3 wt%
(d) molybdenum disulfide: 1 wt%
(e) Zinc dithiophosphate compound (Lubrizol 1360 made by Japan Lubrizol): 2 wt%
(f) phosphorus-free, sulfur-containing extreme-pressure agent (Anglamol 33 made by Japan Lubrizol): 2 wt%
(g) sulfur-containing organic tin compound (75/25 (weight ratio) mixture of dimethyl tin bis(isooctyl thioglycol) and monomethyl tin tris(isooctyl thioglycol): 1 wt%

In any of the above examples, as the base oil of the grease, a mineral oil having the following properties was used.

Viscosity: 141 mm²/s at 40° C.
13.5 mm²/s at 100° C.
Viscosity index: 89

The lubricating grease obtained was sealed in a cross-groove type constant-velocity joint for a propeller shaft of the same type as the one shown in FIGS. 1–3 (in which the PCD clearance was negative and a predetermined preload was applied), and a high-speed endurance test (operating angle: 2 degrees, number of revolutions: 6000 rpm, torque: 200 Nm) was conducted.

Figure 4:
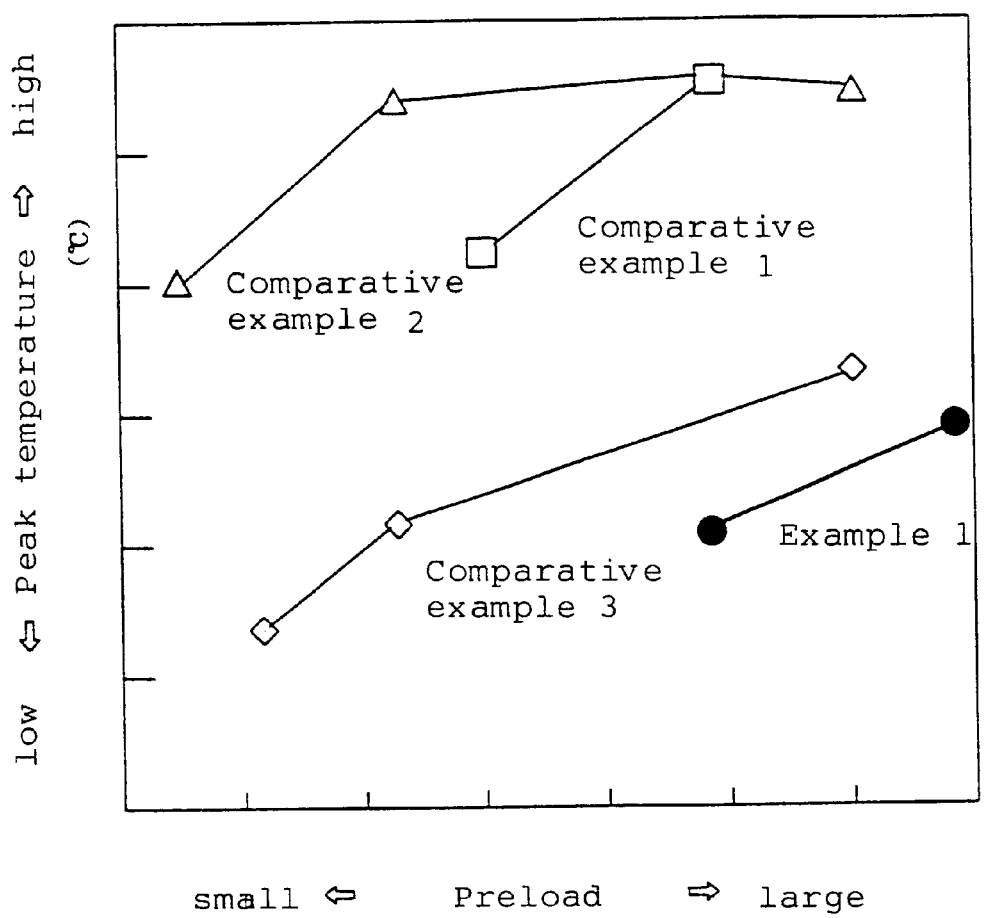
FIG. 4 is a graph showing the relationship between the preload and the peak temperature.

The results thereof are shown in FIG. 4 as a relation between the peak temperature (° C.) and the preload amount (N).

Comparative Example 1 (Example of a lubricating grease not containing organic lead and not containing organic tin either)

In exactly the same manner as in Example 1, a base urea grease was prepared and a grease was prepared by adding the following components (c) and (d) and mixing them.

(c) molybdenum sulfurized dialkyl dithiocarbamate (Vanlube 601 made by R.T. Vanderbilt company): 3 wt%
(d) molybdenum disulfide: 1 wt%

For the grease obtained, a high-speed endurance test on a cross-groove type constant-velocity joint was conducted in exactly the same manner as in Example 1. The results are shown in FIG. 4.

Comparative Example 2 (Example of a lubricating grease not containing organic lead and not containing organic tin either)

In exactly the same manner as in Example 1, a base urea grease was prepared and a grease was manufactured by adding the following components (c), (d) and (f) and mixing them.

(c) molybdenum sulfurized dialkyl dithiocarbamate (Vanlube 601 made by R.T. Vanderbilt company): 2 wt%, and molybdenum sulfurized dialkyl dithiophosphate (MoDTP): 2 wt%
(d) molybdenum disulfide: 1 wt%
(f) phosphorus-free, sulfur-containing extreme-pressure agent (Anglmol 33 made by Japan Lubrizol): 2 wt%

For the grease obtained, a high-speed endurance test on a cross-groove type constant-velocity joint was conducted in exactly the same manner as in Example 1. The results are shown in FIG. 4.

Comparative Example 3 (Example of a grease containing an organic lead but not containing an organic tin)

In exactly the same manner as in Example 1, a base urea grease was prepared and a grease was manufactured by adding the following components (c), (e) and (h) and mixing them.

(c) molybdenum sulfurized dialkyl dithiocarbamate (Vanlube 601 made by R.T. Vanderbilt company): 3 wt%

(e) Zinc dithiophosphate compound (Lubrizol 1360 made by Japan Lubrizol) 2 wt%

(h) organic lead: 2 wt%

For the grease obtained, a high-speed endurance test on a cross-groove type constant-velocity joint was conducted in exactly the same manner as in Example 1. The results are also shown in FIG. 4.

As will be apparent from FIG. 4, for Comparative Examples 1 and 2 in which a lubricating grease not containing organic lead and not containing organic tin either, the effect of suppressing temperature rise of the grease during high-speed rotation was insufficient, the properties of preventing deterioration of the grease were not so good, and as a cross-groove type constant-velocity joint, the performance was inferior.

Also, for Comparative Example 3 in which is used a grease containing an organic lead but not containing organic tin, although the temperature-rise suppressing effect of grease was recognized during high-speed rotation, since it contained an organic lead, it could not reliably avoid a bad influence of the grease on the biosphere.

In contrast, for the cross-groove type constant-velocity joint of Example 1 in which a grease of the predetermined composition is sealed, in spite of the fact that a grease not containing an organic lead is used in view of bad effect on the environment, the effect of suppressing temperature rise of the grease during high-speed rotation was sufficient and the properties of preventing deterioration of the quality of the grease were satisfactory. As a cross-groove type constant-velocity joint for a propeller shaft, the performance was excellent.

As constant-velocity joints used for propeller shafts, besides cross-groove type constant-velocity joints (LJ), double offset type constant-velocity joints (DOJ) and Barfield type constant-velocity joints (BJ) are sometimes used.

For each of these constant-velocity joints, the same greases used in Example 1 and Comparative Examples 1–3 were sealed and a high-load endurance test (operating angle: 2 degrees, number of revolutions: 1000 rpm, torque: 800 Nm) was conducted. The results are shown in Table 1.

These results were evaluated in three stages as excellent (◎), good (○) and inferior (x).

As will be apparent from the results of Table 1, the durability of the grease used in Example 1 and each constant-velocity joint were even better than the case in which a grease containing organic lead was used.

The constant-velocity joint for a propeller shaft in which a grease containing components (a), (b) and (g) is sealed, even though no environmentally harmful organic lead compound is contained, can be used with good durability. The temperature rise of the grease is suppressed during high-speed rotation, and in a cross-groove type constant-velocity joint in which the PCD clearance is negative and a preload is applied, deterioration of the quality of the grease is prevented.

The constant-velocity joint for a propeller shaft in which a grease containing components (a) to (g) is sealed, is high in durability without adding any organic lead compound. Since the temperature rise of the grease is suppressed, especially during high-speed rotation and deterioration of the quality of the grease is prevented, it is excellent as a cross-groove type constant-velocity joint in which the PCD clearance is negative and a preload is imparted, especially as a constant-velocity joint for a propeller shaft.

TABLE 1

| Joint tested | | Grease of example 1 | Grease of comparative example 1 | Grease of comparative example 2 | Grease of comparative example 3 |
|---|---|---|---|---|---|
| Joint tested | BJ | ◎ | ○ | ○ | ○ |
| | DOJ | ◎ | ○ | ○ | ○ |
| | LJ | ○ | ○ | Δ | ○ |

What is claimed is:

1. A constant-velocity joint for a propeller shaft in which a grease containing the following components as essential components is sealed:

base oil;

dirurea thickening agent expressed by the following formula:

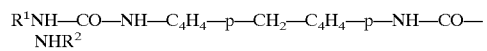

wherein $R^1$ and $R^2$ are the same or different aryl or cyclohexyl groups having a carbon number of 6 or 7; and sulfur-containing organic tin compound.

2. A constant-velocity joint for a propeller shaft containing a grease containing the following components as essential components:

base oil;

dirurea thickening agent expressed by the following formula:

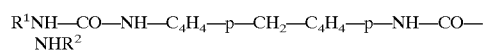

wherein $R^1$ and $R^2$ are the same or different aryl or cyclohexyl groups having a carbon number of 6 or 7;

molybdenum sulfurized dialkyl dithiocarbamate, molybenum sulfurized dialkyl dithiophosphate, or a mixture thereof;

molybdenum disulfide;

zinc dithiophosphate compound, sulfur-nitrogen-containing extreme-pressure agent, or an extreme-pressure agent in which both are mixed;

phosphorus-free, sulfur-containing extreme-pressure agent; and sulfur-containing organic tin compound.

3. A constant-velocity joint for a propeller shaft as claimed in claim 1 wherein the constant-velocity joint is a cross-groove constant-velocity joint.

4. A constant-velocity joint for a propeller shaft as claimed in claim 1 wherein the constant-velocity joint is a constant-velocity joint in which the PCD clearance is negative and a preload is imparted.

* * * * *